United States Patent
Wieres et al.

(10) Patent No.: US 6,199,749 B1
(45) Date of Patent: Mar. 13, 2001

(54) METHOD FOR MANUFACTURING A BRAZED METALLIC HONEYCOMB BODY

(75) Inventors: Ludwig Wieres, Overath; Ferdi Kurth, Köln, both of (DE)

(73) Assignee: Emitec Gesellschaft fuer Emissionstechnologie mbH, Lohmar (DE)

(*) Notice: Subject to any disclaimer, the term of this patent is extended or adjusted under 35 U.S.C. 154(b) by 0 days.

(21) Appl. No.: 09/294,704

(22) Filed: Apr. 19, 1999

Related U.S. Application Data

(63) Continuation of application No. PCT/EP97/05540, filed on Oct. 8, 1997.

(30) Foreign Application Priority Data

Oct. 17, 1996 (DE) ............................................ 196 42 946

(51) Int. Cl.[7] ........................ B23K 31/02; B23K 1/20; B23K 5/213; B23K 20/24; B22F 7/00
(52) U.S. Cl. ...................... 228/181; 228/178; 228/203; 419/5
(58) Field of Search .................... 228/181, 203, 228/208, 4.1; 419/5

(56) References Cited

U.S. PATENT DOCUMENTS

| | | |
|---|---|---|
| 5,431,330 | 7/1995 | Wieres . |
| 5,487,865 * | 1/1996 | Hampton et al. ............ 419/5 |
| 5,501,391 | 3/1996 | Wieres . |

FOREIGN PATENT DOCUMENTS

| | | |
|---|---|---|
| 0 562 116 A1 | 9/1993 | (EP) . |
| 1 452 982 | 10/1976 | (GB) . |

OTHER PUBLICATIONS

Abstract of the Disclosure of DE 38 18 512 A (Nonnemann et al.), dated Jul. 25, 1974.

* cited by examiner

Primary Examiner—Patrick Ryan
Assistant Examiner—Colleen Cooke
(74) Attorney, Agent, or Firm—Herbert L. Lerner; Laurence A. Greenberg; Werner H. Stemer

(57) ABSTRACT

For the manufacture of a metallic honeycomb body which is wound, layered or looped from at least partially structured sheet metal layers, it is proposed to provide at least the structured sheet metal layers with a layer of rolling oil, to the extent that this is not already present in the process for manufacturing the sheet metal layers. A step for partially thermally removing highly volatile components of the rolling oil can follow. The honeycomb body manufactured from the sheet metal layers is brought into contact with a brazing powder which remains adhered to the rolling oil in particular in the area of the contact lines between the sheets. The honeycomb body is subsequently subjected to a brazing procedure in a high temperature brazing furnace under vacuum or a protective gas.

16 Claims, 1 Drawing Sheet

METHOD FOR MANUFACTURING A BRAZED METALLIC HONEYCOMB BODY

CROSS-REFERENCE TO RELATED APPLICATION

This application is a continuation of copending International Application No. PCT/EP97/05540, filed Oct. 8, 1997, which designated the United States.

BACKGROUND OF THE INVENTION

Field of the Invention

The present invention relates to the manufacture of a metallic honeycomb body, in particular for exhaust gas catalytic converters for automotive vehicles, which is wound, layered or looped from at least partially structured sheet metal layers, and is brazed at least in some areas.

In order to catalytically convert exhaust gases in exhaust gas systems of motor vehicles with internal combustion engines, metallic honeycomb bodies are used which serve as a support for a catalytically active material. It is crucial for the durability of such catalytic converter supporting bodies and for the efficiency of similar honeycomb bodies in different areas of application, that the individual sheet metal layers from which the body is composed are connected together by high quality brazed joints, in at least some areas. It is known that such honeycomb bodies are composed from steel sheets resistant to high temperature corrosion, and are brazed in a high temperature vacuum.

Such honeycomb bodies are described, for example, in Published, Non-Prosecuted German Patent Applications DE 23 02 746 A1 and DE 29 24 592 A1. Methods for brazing the honeycomb bodies are also known from these applications.

Furthermore, a method for gluing and brazing metallic honeycomb bodies is known from European Patent EP 0 049 498 B2, which makes possible the application of reduced quantities of brazing material. Further, a method for gluing and brazing such supports is described in Published, Non-Prosecuted German Patent Application DE 38 18 512 A1. This application also includes an overview of known brazing methods. The known brazing methods also include the dry brazing of honeycomb bodies described in Published European Patent Application EP 0 136 514 A1, in which brazing powder is held by surface forces and mechanical adhesion to the layers of sheet metal.

Furthermore, a method for manufacturing a metallic honeycomb body is known from International Patent Application WO 93/25339, wherein at least the structured sheet metal layers of the honeycomb body are provided with a thin layer of a rolling oil, to the extent that this is not already present in the manufacturing process. The rolling oil is subsequently subjected to a thermal treatment wherein the highly volatile components of the rolling oil are removed. The remaining residues of the rolling oil are brought into contact with a highly diluted aqueous solution of a tenside, whereby a layer forms which, after removal of the water by drying, forms an optimum condition for the application of brazing powder.

SUMMARY OF THE INVENTION

It is accordingly an object of the invention to provide a method for manufacturing a brazed metallic honeycomb body that overcomes the above-mentioned disadvantages of the prior art methods of this general type, which is more economical to implement and has improved brazing strength.

With the foregoing and other objects in view there is provided, in accordance with the invention, an improved method for manufacturing a metallic honeycomb body having channels running from a first end face to a second end face of the metallic honeycomb body, the improvement which includes: performing one of winding, layering and looping at least partially structured sheet metal layers to form the metallic honeycomb body; applying a layer of rolling oil to the at least partially structured sheet metal layers after the at least partially structured sheet metal layers have been manufactured; heating briefly the metallic honeycomb body formed of the at least partially structured sheet metal layers coated with the rolling oil for removing volatile components of the rolling oil from uncovered surfaces of the at least partially structured sheet metal layers; applying a brazing powder that adheres to the rolling oil remaining on the at least partially structured sheet metal layers forming the metallic honeycomb body; and performing a brazing procedure on the metallic honeycomb body.

Such a manner of proceeding is particularly economical in that a complete thermal and chemical treatment of the rolling oil and drying is omitted. In an unexpected manner, the brazing procedure can be carried out with improved brazing strength when the brazing powder sticks directly to the rolling oil. The rolling oil is preferably a standard commercial rolling oil which contains minerals, fats and auxiliary substances. When the honeycomb body is wound from sheet metal layers there are typical lines of contact between the sheet metal layers, in the proximity of which the rolling oil collects by capillary forces. Therefore, in these areas, when contact is made with the brazing powder, more brazing medium remains attached where it is also needed for the connections.

In order to additionally advantageously influence the distribution of the brazing medium during brazing, sometimes a thermal de-greasing by heating the honeycomb body can take place. However the temperature and time of the heating should be selected such that only the highly volatile components are removed and in particular in the proximity of the contact lines enough residues of rolling oil remain. In this way when there is contact with the brazing powder, only a little brazing medium remains attached to the free surfaces in the honeycomb body, whereas there is a lot of brazing medium in the area of the contact lines, where it is desired.

Under normal environmental conditions, the rolling oil does not dry out, so the honeycomb body can be transported and subjected to knocks for a long period without the brazing powder trickling out.

The brazing powder is preferably applied at least on the end face of the honeycomb body. The application of the brazing powder can take place in that the honeycomb body is dipped into a pile of brazing powder in a fluidized bed. Depending on the depth of immersion of the honeycomb body in the fluidized bed, the brazing take-up in the axial direction of the honeycomb body can differ.

In another embodiment, in particular for thick walled honeycomb bodies, the honeycomb body is coated over its entire length with brazing powder. Typically, nickel-based brazing medium is used. The average diameter of a brazing powder is preferably greater than 60 $\mu$m, wherein the brazing powder has a minimum grain size of 40 $\mu$m.

An important aspect of the invention is also in that during the brazing procedure, the honeycomb body is disposed such that it is lying down with open lateral end faces. By the lying-down disposition of the honeycomb body during a brazing procedure, it is ensured that the brazing material does not trickle out of the honeycomb body because of the changing viscosity of the rolling oil and its vaporization when the temperature is increased. By the laterally open ends, evacuation and/or application of protective gas is particularly efficiently possible.

According to a further advantageous embodiment of the method, it is proposed that the sheet metal layers have a thickness of at least 60 μm, in particular at least 80 μm, preferably at least 110 μm. This relates to sheet metal layers with a thickness greater than that of known sheet metal layers of a honeycomb body. With thicker sheet metal layers, the effect of alloy formation of the sheet metal layers with the brazing medium is reduced. Preferably, the method is implemented with a honeycomb body with a maximum diameter of 90 mm, preferably a maximum of 70 mm, whereby it is ensured that when the honeycomb body is lying down during the brazing procedure, there is no change in the roundness of the honeycomb body during brazing. It is assumed that the housing surrounding the honeycomb body, in particular a sleeve jacket, has the normal material strength. During the implementation of the method, a high degree of brazing take-up is obtained. The brazing waste during the method is relatively low. By the high degree of brazing take-up, there also results an extensive application in the connection area, whereby a significant connection of the sheet metal layers is achieved. The method is nevertheless also applicable with very thin sheets and very fine grain sizes of the brazing powder.

According to the invention, a honeycomb body is manufactured which is wound, layered or looped from at least partially structured sheet metal layers, and at least the structured sheet metal layers are provided with a layer of rolling oil to the extent that this is not already present in the manufacturing process. The honeycomb body manufactured from the sheet metal layers is brought into contact with a brazing powder that adheres to the rolling oil, and the honeycomb body is subjected to a brazing procedure. Preferably, and particularly economically, honeycomb bodies can be manufactured which are provided with sheet metal layers with a minimum thickness of 60 μm, preferably of 80 μm, in particular of 110 μm. The diameter of the honeycomb body is in particular a maximum of 90 μm, preferably a maximum of 70 μm. Such a honeycomb body is suitable in particular as a catalytic converter for two wheeled vehicles.

Other features which are considered as characteristic for the invention are set forth in the appended claims.

Although the invention is illustrated and described herein as embodied in a method for manufacturing a brazed metallic honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
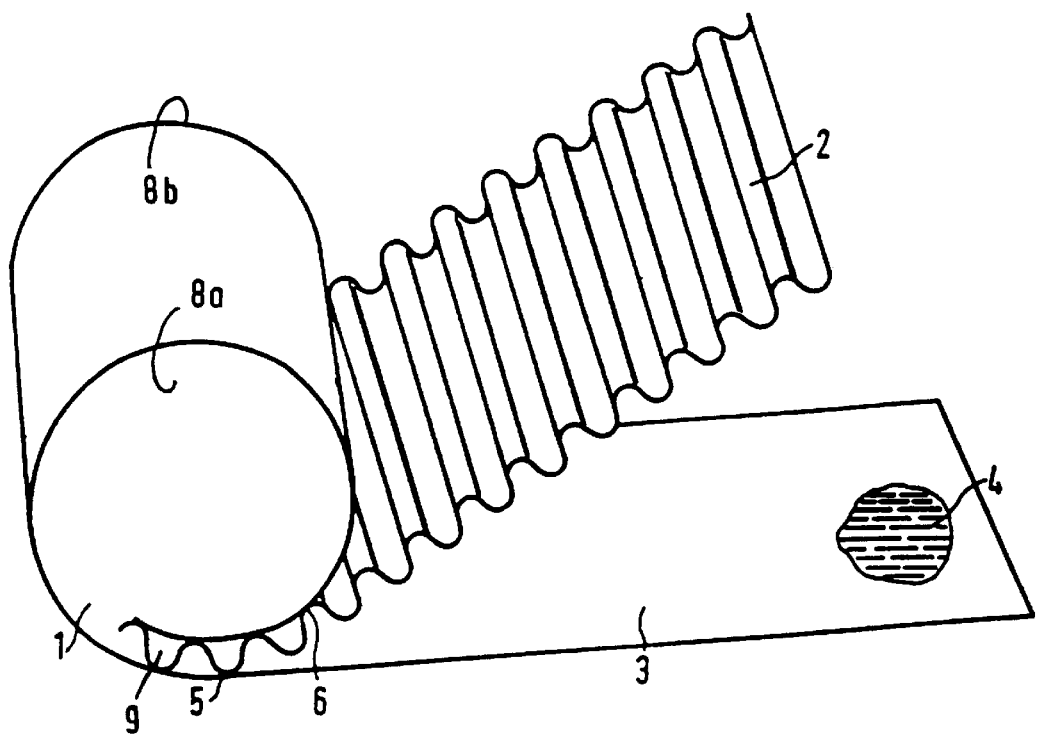
FIG. 1 is a diagrammatic, perspective view of a partially ready-wound honeycomb body.

In all the figures of the drawing, sub-features and integral parts that correspond to one another bear the same reference symbol in each case. Referring now to the figures of the drawing in detail and first, particularly, to FIG. 1 thereof, there is shown the construction of a honeycomb body 1, as used in particular as an exhaust gas catalytic converter supporting body. A corrugated metal sheet 2 and a flat metal sheet 3 are wound into a spiral body, wherein typical contact points 5, 6 occur between the sheet metal layers 2, 3. The surface of the corrugated metal sheet 2 and/or of the flat metal sheet 3 is coated with a layer of rolling oil 4. The ready-wound honeycomb body 1 has a first end face 8a and a second end face 8b, which are connected together by channels 9. The honeycomb body 1 is subjected to the application of a brazing medium, during which brazing powder 7 (FIG. 2) is inserted in the honeycomb body 1. The brazing powder 7 is preferably a coarse brazing medium with a particle size of >60 μm, in particular with an average particle diameter of >63 μm. The individual brazing particles adhere to the rolling oil. The honeycomb body 1 thus coated with the brazing powder 7 is subsequently subjected to a brazing procedure.

The application of the brazing powder 7 can be done, for example, by a fluidized bed, as is described, for example, in International Patent Application WO 93/25339.

Figure 2:
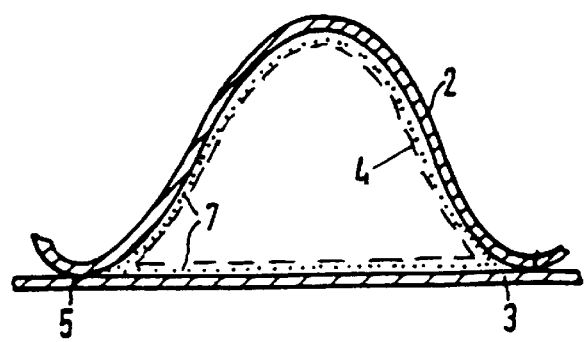
FIG. 2 is a cross-sectional view of a detail through the honeycomb body.

FIG. 2 shows schematically a detail of a cross-section through the honeycomb body 1 with typical points of contact between the corrugated metal sheet 2 and the flat metal sheet 3. The corrugated metal sheet 2 and the flat metal sheet 3 are provided with the layer of rolling oil 4 in which the brazing powder 7 is contained.

The brazing powder 7 adheres to and in the layer of rolling oil 4 without further treatment steps such as, for example, fixing, being necessary.

We claim:

1. An improved method for manufacturing a metallic honeycomb body having channels running from a first end face to a second end face of the metallic honeycomb body, the improvement which comprises:

performing one of winding, layering and looping at least partially structured sheet metal layers to form the metallic honeycomb body;

applying a layer of rolling oil to the at least partially structured sheet metal layers after the at least partially structured sheet metal layers have been manufactured;

heating briefly the metallic honeycomb body formed of the at least partially structured sheet metal layers coated with the rolling oil for removing volatile components of the rolling oil from uncovered surfaces of the at least partially structured sheet metal layers;

applying a brazing powder that adheres to the rolling oil remaining on the at least partially structured sheet metal layers forming the metallic honeycomb body, whereby the brazing powder sticks directly to the rolling oil; and performing a brazing procedure on the metallic honeycomb body.

2. The method according to claim 1, which comprises performing the heating step at a temperature of 100° to 200° C.

3. The method according to claim 1, which comprises applying the brazing powder to at least one of the first end face and the second end face of the metallic honeycomb body.

4. The method according to claim 1, which comprises applying the brazing powder over an entire length of the metallic honeycomb body.

5. The method according to claim 1, which comprises disposing the metallic honeycomb body such that it is lying down with the first end face and the second end face laterally free during the brazing procedure.

6. The method according to claim 1, which comprises forming the metallic honeycomb from at least partially structured sheet metal layers having a thickness of at least 60 μm.

7. The method according to claim 1, which comprises forming the metallic honeycomb from at least partially structured sheet metal layers having a thickness of at least 80 μm.

8. The method according to claim 1, which comprises forming the metallic honeycomb from at least partially structured sheet metal layers having a thickness of at least 110 μm.

9. The method according to claim 1, which comprises forming the metallic honeycomb body with a maximum diameter of 90 mm.

10. The method according to claim 1, which comprises forming the metallic honeycomb body with a maximum diameter of 70 mm.

11. The method according to claim 1, wherein the brazing powder has a grain size of at least 40 μm and an average grain size of >60 μm.

12. The method according to claim 1, wherein the brazing powder has a grain size of at least 40 μm and an average grain size of >63 μm.

13. The method according to claim 1, which comprises performing the brazing procedure in a vacuum.

14. The method according to claim 1, which comprises performing the brazing procedure in an inert gas including argon and nitrogen.

15. The method according to claim 1, which comprises performing the brazing procedure in an inert gas selected from the group consisting of argon and nitrogen.

16. The method according to claim 1, wherein the step of applying the brazing powder is performed substantially without the application of a tenside.

* * * * *